Aug. 29, 1961  L. D. STATHAM  2,998,584
TRANSDUCER
Filed Aug. 29, 1955  3 Sheets-Sheet 2

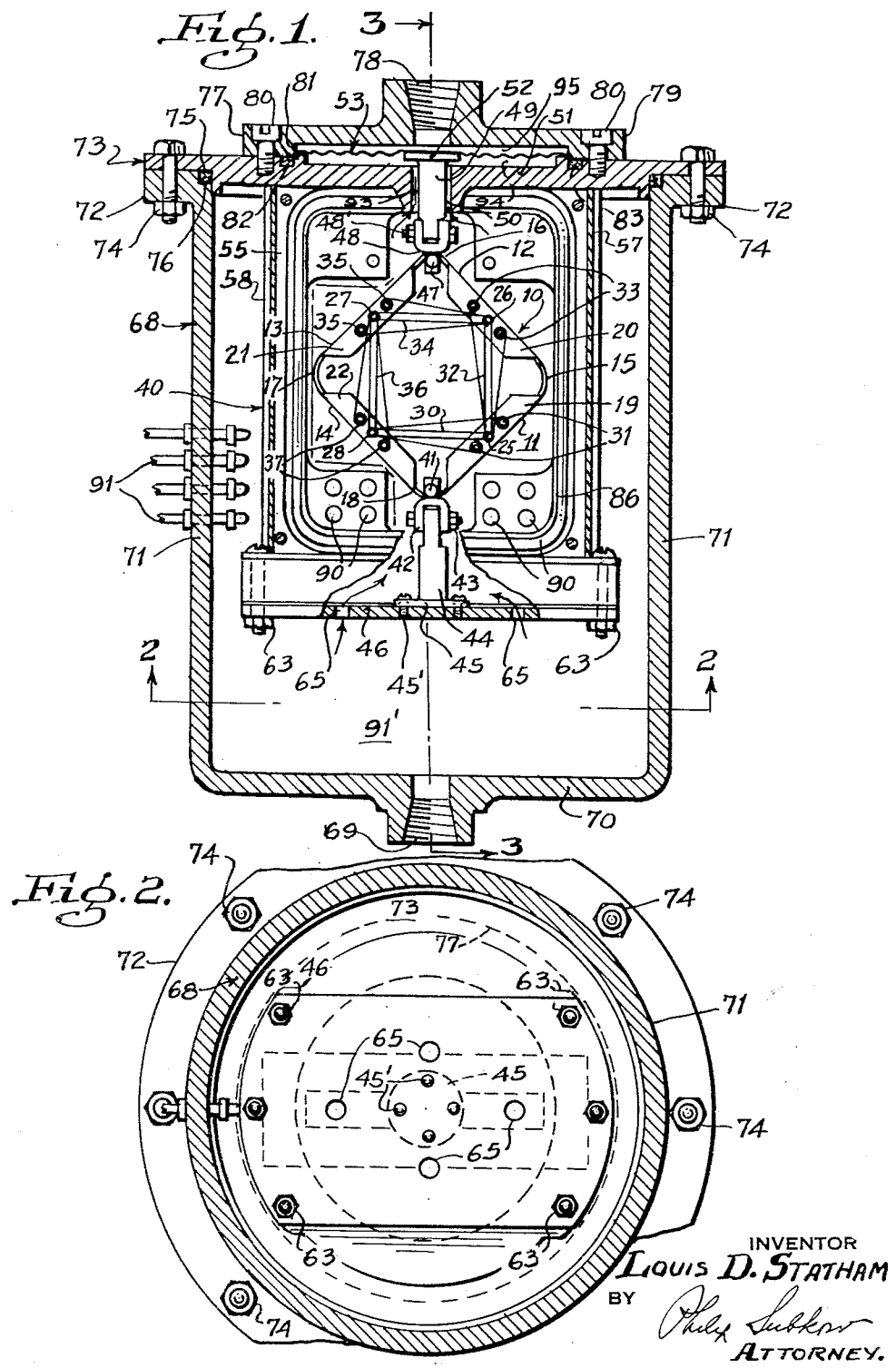

INVENTOR
LOUIS D. STATHAM
BY Philip Subkow
ATTORNEY

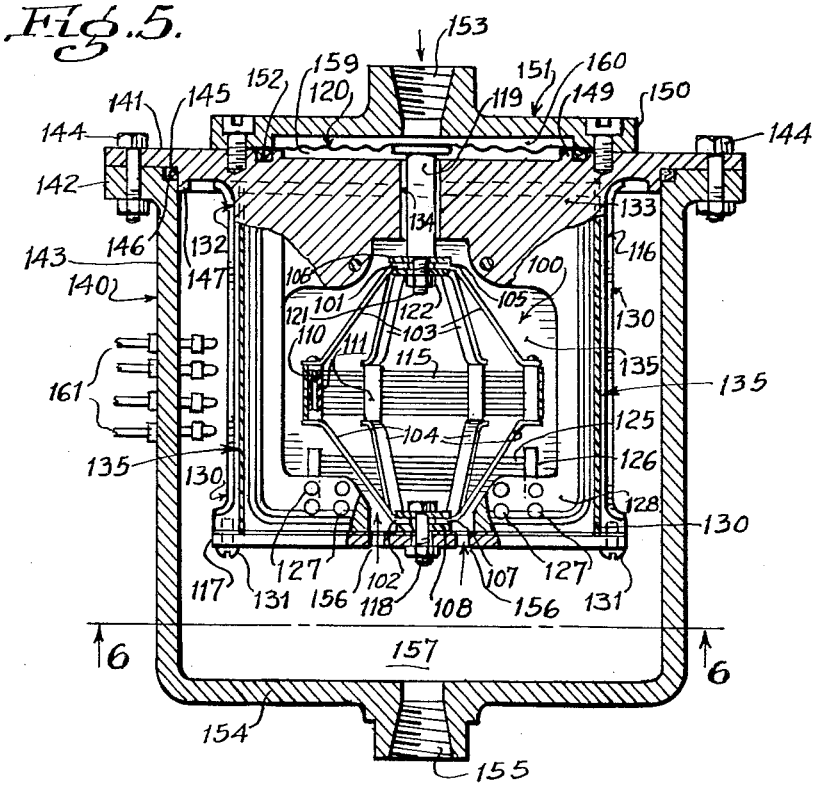

2,998,584
TRANSDUCER
Louis D. Statham, Beverly Hills, Calif., assignor to Statham Instruments, Inc., a corporation of California
Filed Aug. 29, 1955, Ser. No. 530,968
8 Claims. (Cl. 338—4)

This invention relates to improvements in transducers, particularly for measuring physical parameters such as pressure, acceleration, and displacement, in which unbonded electrical strain wire gages are employed. The invention is especially concerned with pressure transducers of this type.

The transducer of the prior art consists essentially of three parts. First, there is a force summing means which for example may consist of a flexible diaphragm or bellows. Second, there is a stationary frame or case to which the force summing means is attached, and which serves to house the force summing means and to establish a fixed reference point. The third essential component is the sensing element, which functions to measure the relative displacement between said force summing means and the frame.

In a known form of strain wire transducer embodying the three essential components noted above, the strain wires comprising the sensing element are mounted on pins positioned in a deformable structure, and means is provided whereby the force or displacement to be measured is transmitted from the force summing means to the deformable structure so as to cause said structure to deform. As a result of this deformation the linear distance between the pins is changed, i.e., either reduced or increased, and the resistance of the strain wires is made to vary accordingly.

Particularly in the immediately foregoing type of transducer known to the prior art, the frame to which the deformable structure is connected serves also as the case, and the dimensions of the case tend to change in response to external conditions, particularly rapid temperature variations, while the sensing element within the case is largely protected from these temperature changes. Also, changes in dimensions of the case can be brought about by stressing of the case itself, as for example when a force or pressure is applied to the sensing diaphragm. Further, the mounting of the instrument by clamping of the case or frame directly to an external body or member tends to distort the case to the extent that an undesirable signal can be produced by the mounting means. Moreover, when a transducer of this type is employed for measuring differential pressure by applying a reference pressure inside the case, such reference pressure tends to alter the dimensions of the case, and hence is capable of producing an undesirable signal or response of the sensing element.

The transducers of my invention are characterized by and distinguished from such prior art transducers in that I provide an additional or outer case around the frame or housing in which the transducers of the prior art have heretofore been mounted. Said frame or housing may form an inner case containing the transducer elements, or act merely as a support for the deformable structure, and the outer case is spaced from said frame or inner case to form a chamber about the frame. This chamber, which may be filled with a gas or a liquid, insulates both the inner case when the frame is in this form, and the transducer elements therein from external temperature changes. When the frame or housing which supports the transducer elements is in the form of a case, said inner case is provided with one or more apertures therein so that the interior of the inner case communicates with the chamber between the inner and outer cases. Thus, any ambient temperature changes will be transmitted equally to the inner case or frame in which the transducer elements are mounted, and to the force summing member and to the sensing element of the transducer. By providing the outer case with a reference pressure connection, the invention device can be employed as a differential pressure gage capable of measuring differential pressure without distortion of the inner case and consequent production of an undesirable signal, since the pressure in the chamber exteriorly of the inner case and the pressure in the interior of said inner case will be equal. Also, the mounting of the instrument for use by clamping of the outer case to an external body will not affect the transducer elements mounted in the inner frame or inner case, and the zero position of the sensing means.

The transducer of my invention comprises a deformable mechanical structure, a frame support, a mechanical connection between the frame support and said structure, and a force summing means connected to the mechanical structure and spaced from the first connection, said structure deforming between the above connections on application of a force to said force summing means, the connection between the frame and said deformable structure acting as a reaction area on application of said force, said deformable structure deforming between said force summing means and said reaction area. The connection between the frame support and the deformable structure remains stationary, while the connection between the force summing means and the said structure is movable to produce deformation thereof. A motion sensing means is connected to the deformable structure, and is responsive to the deformation of said structure, and an outer case is provided surrounding the frame support, the deformable structure, and the sensing means. As previously pointed out, the frame support can be in the form of a case which houses the deformable structure, sensing means, and force summing means, said case being preferably apertured for communication between the interior of said case and of the outer surrounding case.

These and other objects of the invention will be understood by reference to the detailed description given below of certain preferred embodiments of the invention taken in connection with the accompanying drawings, wherein:

FIGURE 1 is a section in elevation of one form of transducer according to the invention, certain parts being shown in full for clarity;

FIG. 2 is a horizontal section taken on line 2—2 of FIG. 1;

FIG. 5 is a section in elevation of another form of the invention transducer, certain parts being shown in full for clarity; and FIG. 6 is a horizontal section taken on line 6—6 of FIG. 5, looking in the direction of the arrows.

Figure 3:
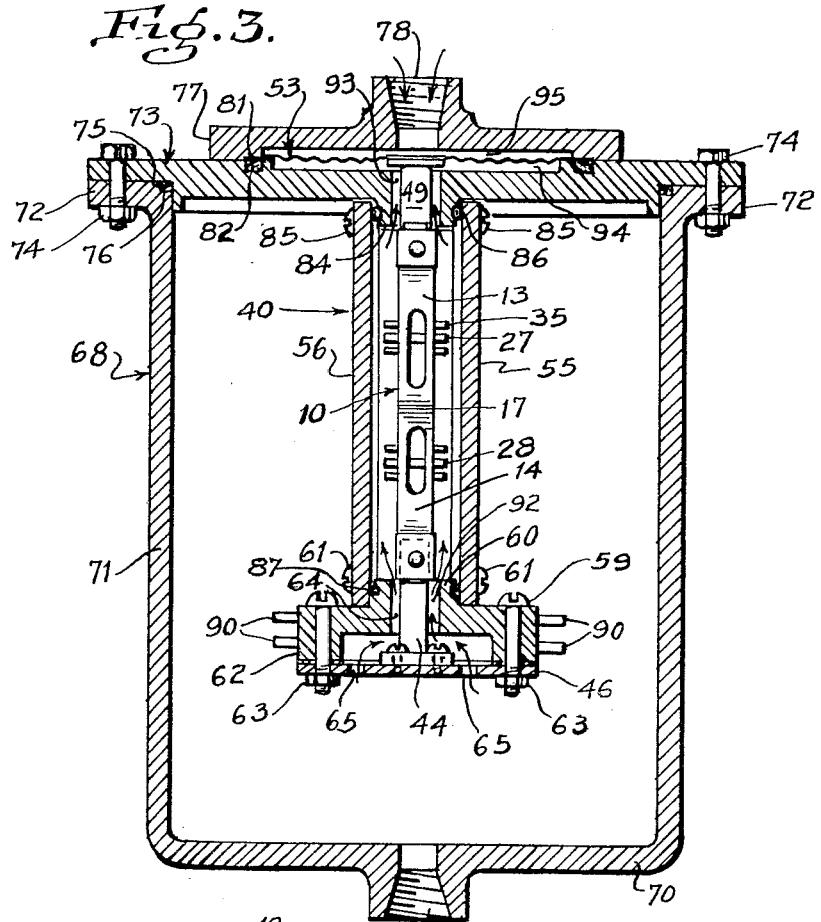
FIG. 3 is another section in elevation of the device shown in FIG. 1, said section being taken on line 3—3 of FIG. 1.

Referring to FIGS. 1 to 4, there is shown a deformable frame 10 in the form of a square or rectangle having sides 11, 12, 13 and 14, and rounded corners 15, 16, 17 and 18. Attached to the opposite edges of each of the sides 11, 12, 13 and 14 of frame 10 are pairs of aligned parallel inwardly extending flanges 19, 20, 21 and 22, respectively (see particularly FIG. 4). The flanges stiffen the sides of the frame 10, so that bending of the frame takes place essentially only at the rounded corners thereof, when a force or pressure is applied to the frame in the manner described more fully below.

Positioned approximately centrally in each of the four pairs of aligned flanges 19, 20, 21 and 22 are the individual pins 25, 26, 27 and 28. An electric resistance strain wire 30 is looped in tension about one end of each of pins 25 and 28, the ends of the wire being connected to terminals 31 positioned on flanges 19 adjacent pin 25. Likewise, strain wire 32 is looped about adjacent ends of pins 25 and 26, the ends of the wire being connected to terminals 33 positioned on flanges 20 adjacent pin 26; strain wire 34 is looped about an end of pins 26 and 27 and connected at its ends to terminals 35 disposed on flanges 21 adjacent pin 27; and a fourth strain wire 36 is looped in tension about adjacent ends of pins 27 and 28, the ends of the wire being connected to terminals 37 positioned on flanges 22 adjacent pin 28. It will be observed that these strain wires are in a single plane essentially parallel to the plane of frame 10 and the flanges thereon.

Frame 10 is mounted at diagonally opposite corners 16 and 18 within an inner rectangular case 40 which acts as a frame for the deformable structure 10. This is accomplished by connecting corner 18 of the frame to a pin 41 carried by a yoke 42, said yoke being bolted at 43 to a bracket 44 in turn connected by means of plate 45 and screws 45' to the bottom 46 of case 40. The diagonally opposite corner 16 of frame 10 is likewise connected to a pin 47 carried by a yoke 48 in turn bolted at 48' to a bracket 49. Bracket 49 extends through an aperture 50 in the top 51 of case 40, and is attached to a plate 52, said plate being connected to a diaphragm 53 mounted in a manner described more fully below.

Case 40 is formed of front and rear plates 55 and 56 and side plates 57 and 58. An enlarged bottom portion 59 has an upwardly extending flange 60 which fits between plates 55 and 56 and is held in this position by screws 61. The outer sides of bottom portion 59 each have a downwardly extending portion 62, to the lower surface of which is connected the bottom member 46 by means of nut and bolt assemblies 63. Bracket 44, which is connected to bottom member 46, passes through an aperture 64 in the enlarged bottom portion 59. A series of apertures 65, shown as four in number in FIG. 2, are formed in the bottom member 46.

The inner case 40, containing frame 10 and the strain wires mounted thereon, is mounted within an outer cylindrical case 68. Case 68 has a pressure fluid inlet 69 in the bottom 70 thereof. The upper edge of the sides 71 of case 68 is flanged as at 72, and a top member 73 is positioned over case 68 and is connected to flange 72 by means of bolt and nut assemblies 74. A ring seal 75 is disposed in a groove 76 between the upper end of side walls 71 and top member 73. A cover 77, having a pressure fluid inlet 78, is positioned over the top member 73. Cover 77 has a downwardly extending flanged peripheral member 79 through which pass screws 80 for connecting the cover with the top member 73. In top member 73 adjacent the flanged member 79 of cover 77 is a lip 81, and in a groove 82 adjacent said lip is disposed an O-ring 83. Diaphragm 53 is positioned over lip 81 and is clamped between the flange 79 of cover 77, and the O-ring 83 and top member 73 of case 68. The upper ends of plates 55 and 56 are connected to a downwardly extending flange 84 disposed centrally fo cover 73, by means of screws 85. An O-ring 86 is disposed between plate 55 and flange 60 on the bottom portion 59 of inner case 40 and between plate 55 and downwardly extending flange 84 of cover member 73. Also, an O-ring 87 is positioned between plate 56 and said flanges 60 and 84.

It will be seen that cover member 73 of the outer case 68 also functions as the top 51 of the inner case 40, and hence that the inner case 40 is supported by the top member 73 of the outer case.

The ends of strain wires 30, 32, 34 and 36 are connected by wires (not shown) from terminals 31, 33, 35 and 37 to the terminals 90 mounted on the inner case 40, and the latter terminals are in turn electrically connected by wires (not shown) to terminals 91 mounted on the side 71 of the outer case 68. It will be observed that the four strain wires are connected as the four arms of a Wheatstone bridge, as understood in the art, said arms being connected via terminals 91 to the indicating and potential source.

As illustrated, the transducer of FIGS. 1 to 4 is employed as a differential pressure gage. A reference pressure can be obtained against the underside of diaphragm 53 by introduction of pressure fluid through inlet 69 into the interior chamber 91' of outer case 68. The fluid flows through apertures 65 in the bottom of inner case 40 and through passage 92 between bracket 44 and the flange 60 of the bottom portion 59, as shown by the arrows in FIGS. 1 and 3, into the interior of inner case 40. The fluid also enters passage 93 between bracket 49 and the flange 84, as shown by the arrows in FIG. 3, and passes into the space 94 between top member 73 and the diaphragm 53. It is thus seen that the reference fluid fills the interior of cases 68 and 40 below diaphragm 53. Pressure fluid is also permitted to enter the inlet 78 to fill the space 95 between the top of the diaphragm and the cover 77.

The difference in pressure exerted by the fluids on the opposite sides of diaphragm 53 will produce a displacement of diaphragm 53, and a corresponding vertical movement of bracket 49 to which the diaphragm is connected. The pin 41 is held stationary in the frame 58 and acts as a reaction point to the force supplied to the deformable structure. The movement of bracket 49 will cause deformation of the frame 10, between the reaction point and the point of application of the force of 47 causing a flexure in the corners 15, 16, 17, 18, which thus act as hinges to permit the relatively rigid arms or sides 11, 12, 13 and 14 to move relative to each other. This results in a relative movement of pins 25, 26, 27 and 28, to vary the tension in the strain wires. Thus, assuming bracket 49 moves downward as viewed in FIG. 1, frame 10 will be deformed in such a manner that the tension on strain wires 30 and 34 will be increased, while strain wires 32 and 36 will be relaxed. The change in resistance of the wires causes an unbalance in the bridge circuit, which may be calibrated against the amount of force or pressure producing the unbalanced condition, to thus determine the magnitude of the differential pressure.

Referring now to FIGS. 5 and 6, there is shown another form of transducer according to the invention. In this embodiment, the deformable element 100 is composed of end members 101 and 102, each end member being provided with a plurality of equal angularly spaced depending arms flexibly connected to the end members and which, if desired, may be made flexible throughout their length. The member 101 has six such arms 103 extending radially therefrom and at an angle to the plane of member 101, and member 102 also has six such arms 104 extending radially therefrom and at an angle to the plane of the end member. The several arms 103 are formed integrally about an annular hub 105, which together with annular washers 106 form the end member 101. Also, the several arms 104 are similarly formed integrally with an annular hub 107, which together with washers 108 form the end member 102.

The outer ends of the several arms 103 are bent outwardly and together define a plane parallel to the plane of end member 101, and the outer ends of the several arms 104 are likewise bent outwardly and together define a plane parallel to end member 102. A post 110 is fastened between the outer adjacent ends of each pair of arms 103 and 104, clamping the outer ends of each of these adjacent pairs of arms to opposite ends of a tubular insulator 111.

Thus, a deformable cage-like element is provided which is symmetrical about the longitudinal axis of the axially aligned end members 101 and 102. An electrical resistance strain wire 115 is wound in tension on the several insulators 111, exerting a restrictive force against outward bending of the arms 103 and 104. The wire is preferably wound in a plurality of turns, and preferably comprises two separate wire elements wound in bifilar fashion about the insulators to constitute two opposite active arms of a bridge circuit, as is well known in the art.

The deformable cage-like element 100 is mounted in an inner frame in the form of a cylindrical case or housing 116 with one end member 102 of element 100 being rigidly secured to the bottom 117 of the housing by means of the bolt and nut assembly 118, and the other end element 101 is connected by means of a rod 119 to a force summing diaphragm 120. Rod 119 has a stud 121 at the lower end thereof, which passes through the annular hub 105 of end member 101, said stud receiving the nut 122. The end member 101 is free to follow the displacement of the diaphragm in response to variation in pressure to which it is subjected.

An electrical strain wire 125, preferably in the form of a bifilar winding, is positioned about insulated pins 126 rigidly attached to the bottom 117 of the inner case or housing 116. Bifilar winding 125 forms the two inactive arms of the bridge circuit. Each of the four windings making up the arms of the bridge is connected to a pair of terminals 127 mounted on a plate 128 in the case 116.

The bottom 117 of the inner case 116 is connected to support rods 130 of said case by means of screws 131, and a pair of semi-cylindrical shells 135 are positioned opposite each other with their adjacent ends located in grooves 136 formed in rods 130, to form the enclosed case 116. Shells 135 are supported on the bottom member 117 and are held in position thereon by means of screws 131'. The top member 132 of case 116 is formed of a thick portion 133 having a passage 134 therein to receive rod 119 for free longitudinal movement thereof normal to the plane of diaphragm 120.

The inner case 116 is rigidly mounted at the top of an outer cylindrical case 140 by means of an outwardly extending member 141 integrally connected to the outer periphery of the thick upper portion 133 of case 116, the outer periphery of member 141 resting on a peripheral flange 142 formed along the top edge of the side wall 43 of case 140, and said member 141 being connected to said flange by bolt and nut assemblies 144. An O-ring 145 is positioned in a groove 146 at the upper inner end of case wall 143, forming a seal between said wall and a short depending flange 147 on member 141, which flange abuts the upper end of the inner surface of case wall 143. It is seen that the peripheral outer member 141 which is connected to the thick central portion 133 constitutes the upper closure member for the outer case 140.

Diaphragm 120 is positioned at its periphery over a lip 149 on the upper surface of portion 133, and is clamped between said lip and an outer depending flange 150 of a central cover 151, said flange abutting the outer surface of said lip. An O-ring 152 is disposed in a groove between said flange and said upper portion 133. Cover 151 has a central pressure fluid inlet 153, and the bottom 154 of the outer case 140 also has a centrally positioned pressure fluid inlet 155 therein. The bottom 117 of the inner case 116 has a plurality of apertures 156 to place in communication the interior of inner case 116 and the space 157 exteriorly of case 116 but within outer case 140.

Terminals 161 are mounted on the exterior of case 140, and these terminals have connection by means of wires (not shown) to the terminals 127 on inner case 116. Terminals 161 are in turn connected to a sensing instrument and a source of potential to complete the bridge circuit.

Pressure fluid applied through inlet 155 passes into the space 157 within outer case 140, through apertures 156 of inner case 116 to the interior thereof, and through passage 134 between the rod 119 and the upper portion 133, into the space 159 between said upper portion and diaphragm 120. Thus, this pressure fluid fills the interior of cases 140 and 116, and all the spaces below diaphragm 120. Pressure fluid applied through inlet 153 fills the space 160 between diaphragm 120 and the cover 151.

The difference in pressure exerted by the fluids on the opposite sides of diaphragm 120 will produce a displacement of the diaphragm and a corresponding vertical movement of rod 119, resulting in a proportional displacement of the end member 101 of the deformable element 100. This displacement will, depending on its magnitude and direction, vary the strain and resistance of the coil 115 constituting the active arms of the bridge circuit, since the opposite end member 102 of element 100 is maintained in a fixed position relative to the displacement of the diaphragm and acts as a reaction point to the application of the force to the end element 101. The resultant movement causes a flexure of the arms 103 and 104 with respect to the end members 101 and 102 respectively, causing an outward radial movement of posts 110 on downward movement of end member 101. Since the strain and resistance of coil 125 remains constant, the relative change in resistance of wire 115 is sensed in the bridge circuit, and a measurement of the pressure differential is thereby obtained.

If desired, the interior of cases 68 and 40 of the modification of FIG. 1 or of cases 140 and 116 in the modification of FIG. 5 can be evacuated through connection 69 or 155, in which case absolute pressure applied by a fluid introduced through the fluid connection 78 or 153 can be sensed or measured. As will be observed and will be obvious to those skilled in the art the inlet 69 of FIG. 1 and 155 of FIG. 5 may be sealed or opened to the atmosphere in which case the pressure gauge measures gauge pressure against ambient pressure in the case of a reference pressure. Further, instead of sensing fluid pressures applied through inlet 78 or 153, a rod can be connected to the upper side of diaphragm 53 or 120, and a force can be applied to said rod against the diaphragm. In this manner the differential force between the forces applied by such rod and by the fluid in cases 40 and 68, or in cases 116 and 140, can be sensed.

From the foregoing, it is seen that I have designed a novel transducer, particularly of the strain gage type, and especially characterized by incorporation of a deformable element to which the strain wires are connected, having advantages not possessed by prior art instruments. These advantages and results flow from the mounting of the frame or case containing the strain wire transducer and force summing element within an outer case, with fluid communication established between the interior of said outer case and the interior of the inner case when the frame housing the transducer elements is in this form.

In this manner, it is seen that any ambient temperature changes occurring externally of the outer cases 68 or 140 will be transmitted equally by the fluid, e.g., gas or liquid in the space between said outer case and the inner case 40 or 116, to said inner case, and by the fluid in said inner case to the transducer elements including the deformable element, the strain wires, and the force summing diaphragm. Hence, any displacement or changes in dimensions, as a result of such external temperature variations, of the inner case in which the transducer is mounted will be compensated by a corresponding displacement or changes in dimensions of the transducer elements, and substantially no error will be introduced as result of relative displacement between the inner case and the transducer elements, particularly the force summing diaphragm and strain wires, mounted in said inner case. Also, isolation of the inner case and the transducer elements therein from exterior temperature changes by a body of fluid between the inner and outer cases and within the inner case, acts to minimize effects of such temperature variations on the inner case and the transducer elements.

When the invention device is employed as a differential pressure gage, the reference pressure supplied by the fluid in the inner case, i.e., case 40 or 116, against the diaphragm does not tend to distort said case in relation to the sensing diaphragm and deformable member, since the pressure of the fluid between the inner and outer case is equal to the pressure within the inner case. Hence, no undesirable signal is produced by movement of the diaphragm relative to the case which houses the transducer, due to the reference pressure in said case, as heretofore inherent in the prior art transducers having a single case. Also, it is seen that the transducer of the invention can be mounted for use by clamping the outer case to a base structure. The transducer elements are thus isolated from the distorting stresses induced by mounting of the instrument, and thus the zero setting is unaffected, as in the case of the prior art deformable type where the mounting stresses induce a distortion of the sensitive element to cause the production of a signal which affects the zero setting of the instrument.

As seen in FIG. 1 the inner case 40 is connected to the top member 73 of the outer case 68 and diaphragm 53 is connected between member 73 and cover 77 so that on expansion or contraction of the outer case, e.g., by an increase in temperature the inner case 40 will also move with the outer case since the inner case 30 has a common connection 73 with the outer case. Also, the diaphragm 53 will move in unison with the expansion or contraction of the outer case. Hence, it can be said that the inner case 40 floats with the outer case and as a result no deformation of the deformable frame 10 occurs due to expansion or contraction of the outer case resulting from temperature changes, and the diaphragm 53 remains in the same position with respect to the deformable frame. The above applies to the device at FIG. 5.

Figure 4:
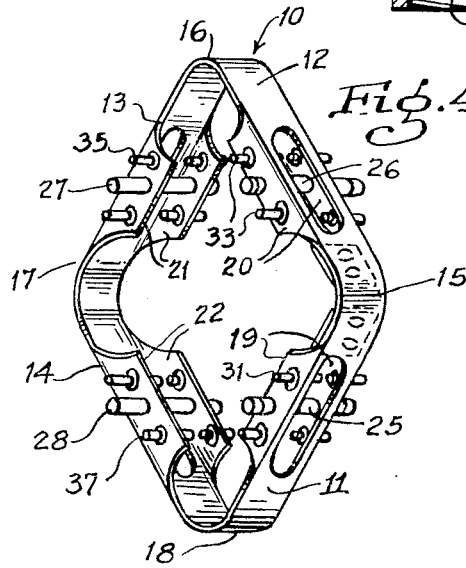
FIG. 4 is a perspective view of an element of the device of FIG. 1.

It is noted that in the embodiment of FIGS. 1 to 4, one set of strain wires is shown disposed in a plane on one side of the frame 10. If desired, however, another set of strain wires may be connected in a manner similar to that described above in a plane on the other side of said frame, the planes of said two sets of strain wires being essentially parallel to each other. The second set of strain wires can be connected to a second set of pins and terminals on the flanges 19, 20, 21 and 22 located on the opposite sides of the frame from strain wires 30, 32, 34 36, said pins and terminals corresponding to pins 25, 26, 27 and 28, and terminals 31, 33, 35 and 37, as seen in FIG. 4. The second set of strain wires may be incorporated in a known manner into the bridge circuit to increase the sensitivity thereof.

In place of employing strain wire sensing means, as shown in the drawings, I may connect other types of sensing means to the deformable structures 10 or 100. Thus, for example, I can connect an inductive type of sensing means or optical type sensing means or transducer to the deformable structure.

A force summing means other than a diaphragm such as indicated at 53 and 120 in the drawings can be utilized. Thus, for example, the diaphragm may be replaced by a bellows. Also, if desired, a weight may be positioned on the diaphragm or otherwise resiliently suspended and connected to rod 49 or 119 where this device is to act as an accelerometer. Rod 49 or 119 may be connected to any body undergoing displacement, and the device can be utilized for measuring the magnitude of the displacement and thus employed as an extensometer.

Instead of mounting the transducer elements in an enclosed inner case as illustrated at 40 and 116 in the embodiments of FIGS. 1 and 5, said elements may be supported in an open frame, with the outer case placed about or surrounding said frame. While the mounting of the transducer elements in an enclosed inner case is preferred because in addition to its other advantages, the inner case serves as a baffle or shield between the outer case and the transducer elements, to form a chamber which insulates the elements from variations in temperature occurring in the outer chamber or outside the outer case, the incorporation of the transducer elements in an open frame surrounded by an outer case results in an instrument which retains certain of the other important advantages of the invention, such as isolation of the transducer elements from distorting stresses induced by mounting the outer case on a base member.

While I have described a particular embodiment of my invention for the purpose of illustration, it should be understood that various modifications and adaptations thereof may be made within the spirit of the invention as set forth in the appended claims.

I claim:

1. A transducer comprising a deformable structure, a plurality of pins mounted on said deformable structure at linearly separated points, said deformable structure including mechanical connections between spaced pins, said deformable structure being deformable at areas of said mechanical connections between said spaced pins, electrical resistance strain wires mounted upon and extending between said pins, a case, a frame mounted in said case and connected at a localized area of said frame to said case adjacent one wall of said case, said frame being spaced from said case at all other areas of said frame and being disconnected from said case throughout said other areas, a force transmitting means connected to said deformable structure and flexibly connected to said case adjacent said localized area, means mounting said deformable structure on a portion of said frame removed from said localized area and at an area of said deformable structure spaced from and in force reactive relation to said connection of said force transmitting means to said deformable structure, whereby on application of a force to said force transmitting means, said force transmitting means moves with respect to said case and the linear separation between each of said pins is altered.

2. The transducer of claim 1 in which said mechanical connections include flexures.

3. The transducer of claim 1 in which the flexible connection between said force transmitting means and said case is a diaphragm connected to said case.

4. The transducer of claim 2, in which the flexible connection between said force transmitting means and said case is a diaphragm connected to said case.

5. A transducer comprising a case having a cover at one end of said case, a frame supported in said case by said cover and spaced from said case at other areas of said frame and being otherwise disconnected from said case, a diaphragm mounted on said cover adjacent said frame, a deformable structure, a plurality of pins mounted on said deformable structure at linearly separated points, said deformable structure including mechanical connections between said pins, said structure being deformable at areas of said mechanical connections between said spaced pins, a force transmitting means connected to said deformable structure and to said diaphragm, a connection between said deformable structure and said frame at an area of said frame and said deformable structure spaced from said connection of said force transmitting means to said diaphragm, electrical resistance strain wires mounted upon and extending between said pins, whereby on application of a force to said diaphragm said force is transmitted to said deformable structure to deform the same and to vary the linear separation between adjacent pins.

6. In the transducer of claim 5, in which said deformable structure includes a plurality of arms disposed at an angle to each other, each of said arms being connected to a pin and flexibly connected to each other.

7. In the transducer of claim 6 in which said deformable structure is a parallelogram structure weakened at the corners, said corners being flexible and forming hinge points.

8. A transducer comprising a deformable structure, a plurality of pins mounted on said deformable structure at lienarly separated points, said deformable structure including mechanical connections between spaced pins, said deformable structure being deformable at areas of said mehcanical connections between said spaced pins, electrical resistance strain wires mounted upon and extending between said pins, a housing for said deformable structure including a case and a frame, means mounting said frame in said case in strain isolated relationship from said case by connecting said frame to said case at a localized area of said case with said frame being spaced from said case at all other areas of said frame and being disconnected from said case throughout said other areas, a force responsive transmitting means connected to said deformable structure and to said housing adjacent said localized area, means mounting said deformable structure on a portion of said frame removed from said localized area and at an area of said deformable structure spaced from and in force reactive relation to said connetcion of said force responsive transmitting means to said deformable structure, whereby on application of a force to said force responsive transmitting means, said force responsive transmitting means moves with respect to said case and the linear separation between each of said pins is altered.

References Cited in the file of this patent

UNITED STATES PATENTS

| | | |
|---|---|---|
| 2,509,421 | Carter | May 30, 1950 |
| 2,510,073 | Clark | June 6, 1950 |
| 2,600,701 | Statham et al. | June 17, 1952 |
| 2,636,964 | Lancor et al. | Apr. 28, 1953 |
| 2,699,069 | Bailey | Jan. 11, 1955 |
| 2,814,946 | Harris | Dec. 3, 1957 |